United States Patent [19]
Egging et al.

[11] Patent Number: 5,845,689
[45] Date of Patent: *Dec. 8, 1998

[54] FEED RATE CONTROL SYSTEM FOR STUMP CUTTERS

[75] Inventors: Philip J. Egging; Brent A. Bartels; Gary W. Kappel, all of Pella, Iowa

[73] Assignee: Vermeer Manufacturing Company, Pella, Iowa

[*] Notice: The term of this patent shall not extend beyond the expiration date of Pat. No. 5,588,474.

[21] Appl. No.: 770,939

[22] Filed: Dec. 19, 1996

Related U.S. Application Data

[63] Continuation-in-part of Ser. No. 473,102, Jun. 7, 1995, Pat. No. 5,588,474.

[51] Int. Cl.[6] .................................................. A01G 23/06
[52] U.S. Cl. .............................. 144/334; 37/302; 60/431; 60/456; 144/24.12; 144/356; 241/101.72; 241/101.76; 417/34; 417/53
[58] Field of Search .................. 144/24.12, 337, 144/356; 37/302; 60/414, 431, 449, 452, 456; 241/101.71, 101.72, 101.74, 101.76; 417/34, 53

[56] References Cited

U.S. PATENT DOCUMENTS

| | | |
|---|---|---|
| 2,692,951 | 10/1954 | Voelker . |
| 3,198,224 | 8/1965 | Hiley . |
| 4,448,021 | 5/1984 | Hawkins . |
| 4,523,892 | 6/1985 | Mitchell . |
| 4,709,736 | 12/1987 | Bellars . |
| 4,763,473 | 8/1988 | Ziplies . |
| 5,332,964 | 7/1994 | Ouchi . |
| 5,355,918 | 10/1994 | Lang . |
| 5,451,869 | 9/1995 | Alff . |
| 5,588,474 | 12/1996 | Egging ................................. 144/24.12 |
| 5,657,803 | 8/1997 | Kappel et al. ........................ 144/24.12 |

OTHER PUBLICATIONS

Copy—of 2 page document (pp. 19 and 20)—Waterman Hydraulics.
Omron; Cylindrical Inductive Proximity Sensor—Ordering Information; one sheet—p. 409.
Model MS Motion Switch and Model MSD Motion Switch; pp. 5 & 8 from catalog (two sheets).

(List continued on next page.)

*Primary Examiner*—W. Donald Bray
*Attorney, Agent, or Firm*—Henderson & Strum

[57] ABSTRACT

An apparatus to maintain optimum engine speed and cutter wheel speed to maintain peak power output of the engine and peak flywheel effect of the stump cutter wheel and method for maintaining optimum engine speed. The stump cutter has a rotating cutting wheel powered by an engine, and the cutter is mounted to be moved laterally. The mounting includes a boom and at least a first hydraulic cylinder for urging the boom to move along the path of travel over the surface of a stump. The hydraulic cylinder is activated by a hydraulic circuit which includes a source of pressurized hydraulic fluid. A pressure hydraulic line connects the source of hydraulic fluid to a first port of the hydraulic cylinder and a return line is connected to a second port of the hydraulic cylinder. A valve diverts a portion of flow from the pressure line to the return line or to a sump. The valve is shiftable between at least a first and a second position. In the first position, substantially all hydraulic fluid is passed along the pressure line to the hydraulic cylinder. In the second position, at least a portion of the hydraulic fluid is diverted from the pressure line. Sensors are provided for sensing a speed of the engine either directly or indirectly and may be used to sense a condition of a stump cutter wherein the condition is a function of a speed of rotation of the engine. A circuit interconnects one of the sensors and the valve. The circuit selectively shifts the valve from the first position to the second position when the sensed speed of the engine is less than a predetermined minimum speed.

18 Claims, 7 Drawing Sheets

OTHER PUBLICATIONS

Digital Tachometer, one sheet pamphlet.

4B Components Limited; Rotech Encloder Rotating Shaft Monitor; Jan. 1996; pamphlet consisting of one sheet.

McMaster–Carr; Proximity Sensing Switches—Photoelectric Sensors & Timers; one sheet from catalog.

Reliance Electric; USAF/USN Bearing Monitors; consisting of three sheets (pamphlet).

Timothy J. Maloney; Industrial Solid–State Electronics Devices and Systems (Second Edition); pp. 418, 419, 420, 421 and 422 (Chap. 11).

CONTROL LEVERS

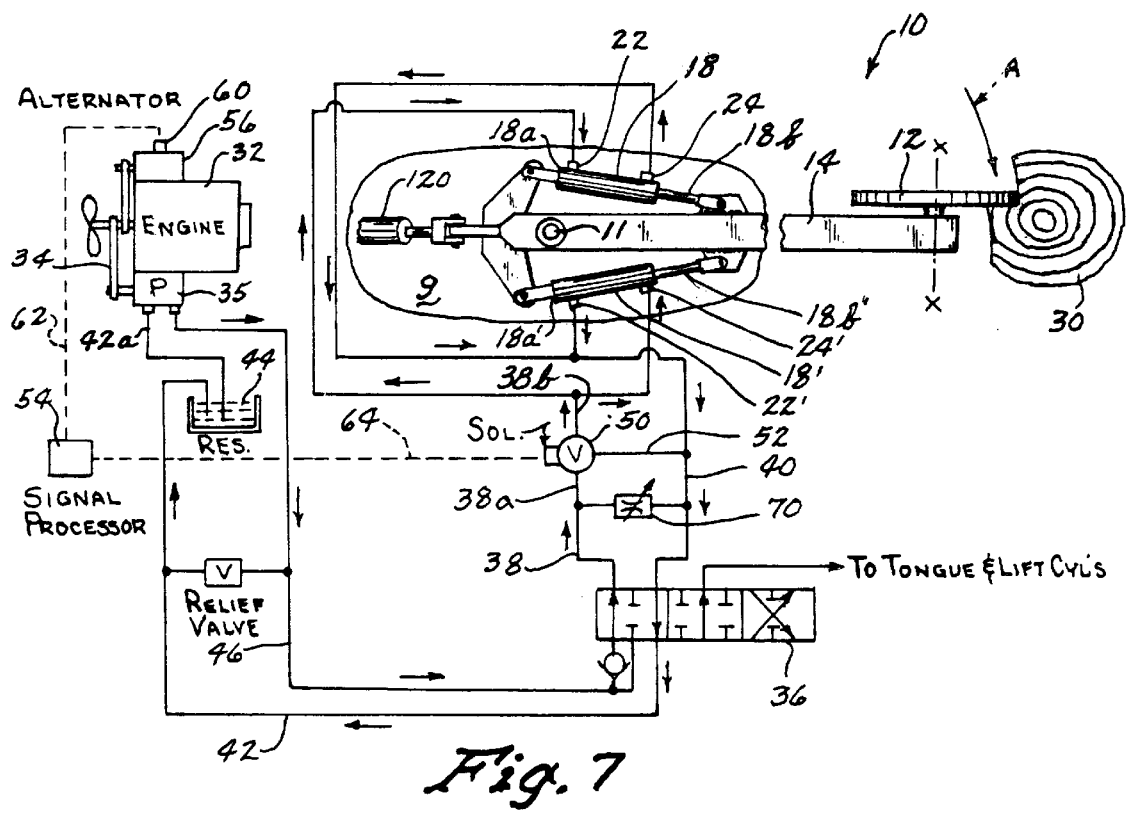
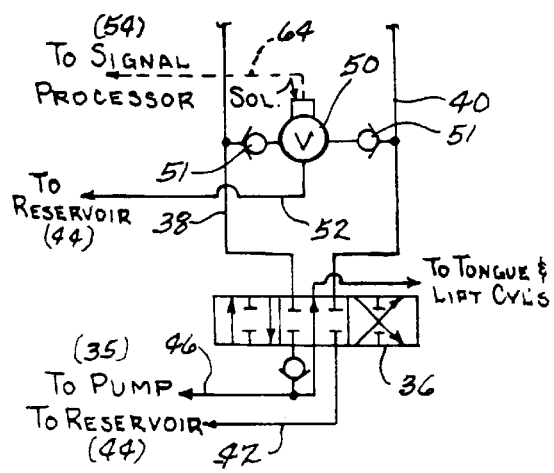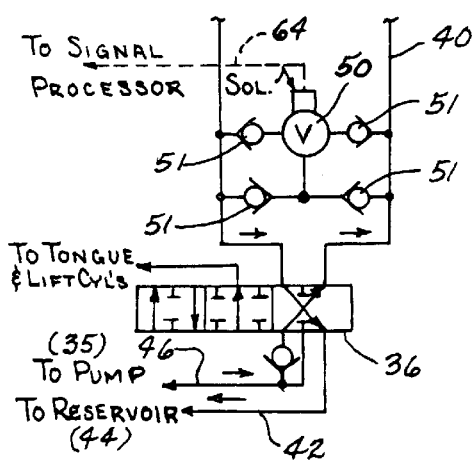

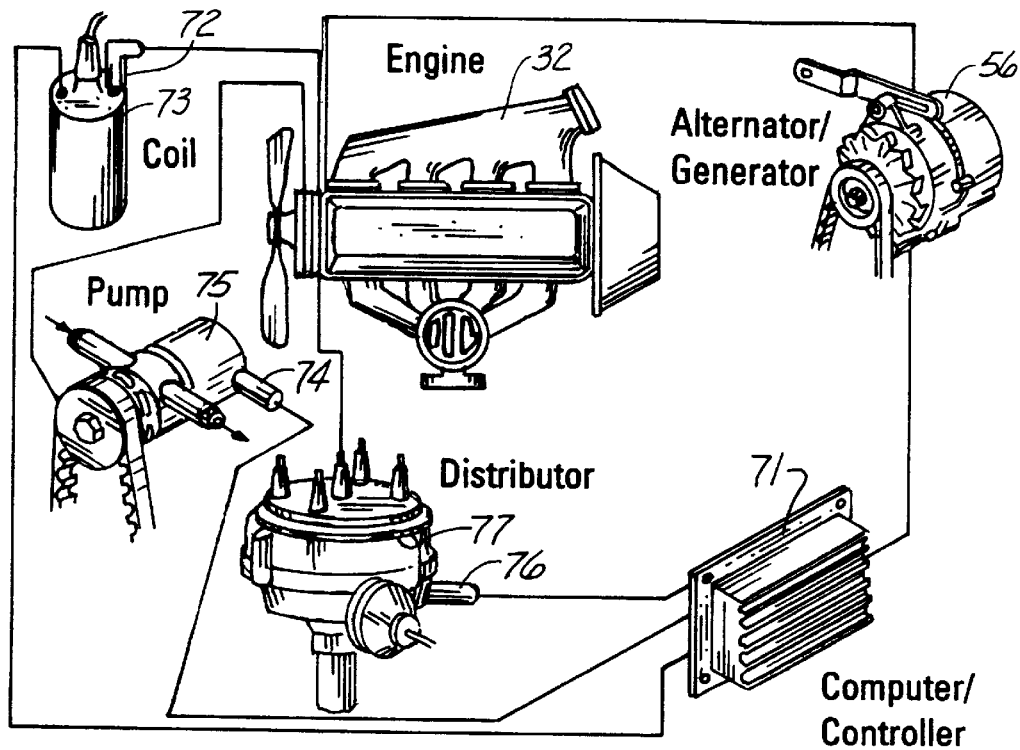
Fig. 16
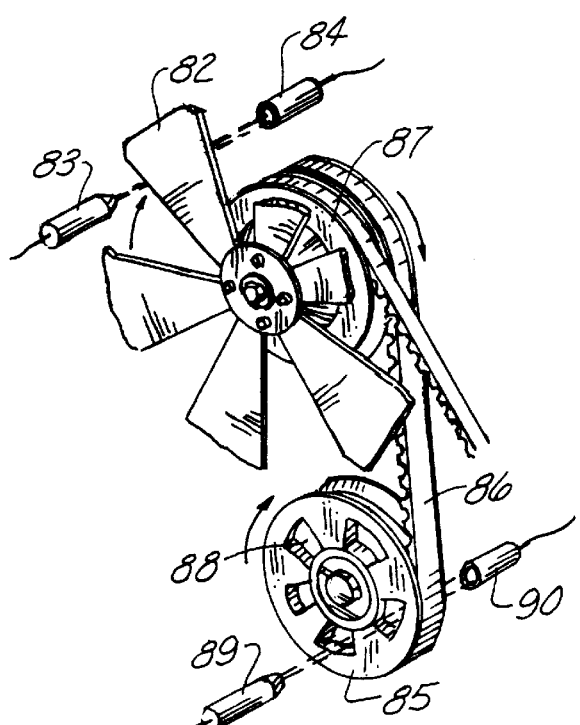
Fig. 18
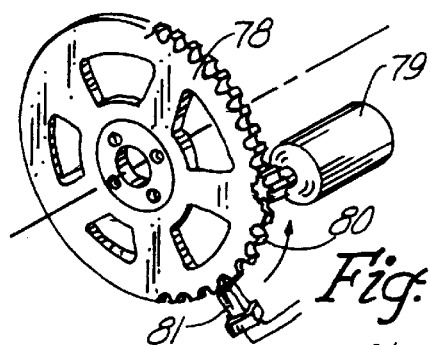
Fig. 17
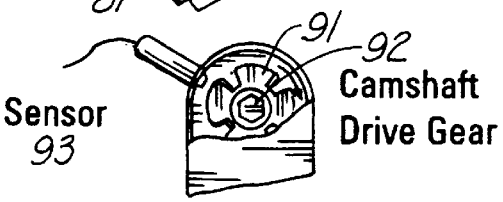
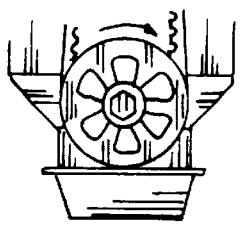
Fig. 19

FEED RATE CONTROL SYSTEM FOR STUMP CUTTERS

CROSS-REFERENCE TO RELATED APPLICATIONS

This application is a Continuation-in-Part of application Ser. No. 08/473,102, filed Jun. 7, 1995, now U.S. Pat. No. 5,588,474 the disclosure of which is hereby incorporated by reference in its entirety.

STATEMENT REGARDING FEDERALLY SPONSORED RESEARCH OR DEVELOPMENT

Not Applicable

AUTHORIZATION PURSUANT TO 37 C.F.R. §1.71 (d)(e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention pertains generally to stump cutters, and more particularly to an apparatus and method for controlling the rate of feed of a stump cutter.

2. Description of the Related Art

Stump cutting machines are well known for removing undesirable tree stumps. Such machines include a rotating cutter wheel driven by a gas or diesel engine. The cutter wheel, while rotating, is advanced toward the stump and laterally across the face of the stump. The cutter wheel is mounted at one end of a boom which is, in turn, pivotally mounted on a support frame. Hydraulic boom swing cylinders are used to pivot the boom about the pivot point to move the cutter wheel back and forth across the face of the stump to cut it away.

Stump cutters are often subjected to overload conditions which result in premature failure of certain components such as structural and shielding members, engines and drive train members. Also, with most engines, a loss of power output occurs during an overload condition as the engine speed is reduced below a rated operating speed. Less power to the cutting wheel results in reduced productivity. Further, the loss of cutter wheel speed causes a loss of cutter wheel energy which results in the wheel being less effective in smoothing out shock loads. Such loads may be several times greater than the maximum engine output torque. Also, when the cutter wheel loses speed, engine power required to accelerate the wheel back to full speed is not available for cutting the stump.

In prior art stump cutting machines, an operator has access to a needle valve to permit the operator, at his discretion, to adjust the needle valve to control the hydraulic oil to the boom cylinders in order to properly load the engine. The operator commonly adjusts the needle valve based on the sound of the engine. Such an adjustment is subject to operator error. Furthermore, an operator may not react fast enough or frequently enough to adapt to changing engine load conditions. Also, an operator might simply forget to adjust the needle valve or otherwise fail to adjust the valve during operation. As a result, at any given moment, the engine may be either overworked or underworked.

Those concerned with these and other problems recognize the need for an improved feed rate control system for stump cutters.

BRIEF SUMMARY OF THE INVENTION

The present invention provides a method and an apparatus to maintain optimum engine speed and cutter wheel speed to maintain peak power output of the engine and peak flywheel effect of the stump cutter wheel. The stump cutter has a rotating cutting wheel powered by an engine, and the cutter is mounted to be moved laterally. The mounting includes a boom and at least a first hydraulic cylinder for urging the boom to move along the path of travel over the surface of a stump. The hydraulic cylinder is activated by a hydraulic circuit which includes a source of pressurized hydraulic fluid. A pressure hydraulic line connects the source of hydraulic fluid to a first port of the hydraulic cylinder and a return line is connected to a second port of the hydraulic cylinder. A valve diverts a portion of flow from the pressure line to the return line or to a sump. The valve is shiftable between at least a first and a second position. In the first position, substantially all hydraulic fluid is passed along the pressure line to the hydraulic cylinder. In the second position, at least a portion of the hydraulic fluid is diverted from the pressure line. A sensor is provided for sensing a speed of the engine or a condition of a component of the stump cutter which is a function of a speed of rotation of the engine. A circuit interconnects the sensor and the valve. The circuit selectively shifts the valve from the first position to the second position when the sensed speed of the engine is less than a predetermined minimum speed.

Therefore, an object of the present invention is the provision of an improved feed rate control system for stump cutters.

Another object of the present invention is to provide an improved feed rate control system for a stump cutter.

A further object of the invention is to provide a method and an apparatus for maintaining optimum engine speeds for stump cutters.

A still further object of the present invention is to provide an apparatus for preventing the engine speed of a stump cutter from being reduced below a predetermined amount upon advancement of the cutter wheel into a stump.

In accordance with the present invention a method for operating an engine of a stump cutter involves sensing a condition of a component of a stump cutter having an engine wherein the condition is a function of a speed of rotation of the engine and controlling movement of the stump cutter toward a stump based on the function of the speed of rotation of the engine.

For purposes of the present invention, the controlling involves reducing a speed of advancement of the stump cutter toward the stump when the speed of rotation of the engine is below a predetermined speed of rotation, increasing a speed of advancement of the stump cutter toward the stump when the speed of rotation of the engine is above a predetermined speed of rotation, and/or stopping advancement of the stump cutter toward the stump when the speed of rotation of the engine arrives at a predetermined speed of rotation.

For purposes of the present invention, the component of the engine the condition of which is sensed may be at least one member selected from the group consisting of a coil, a pump, a distributor, a generator, an alternator, a flywheel, a fan blade, a pulley, a camshaft, a cutter wheel, a drive train and a drive shaft, which are operably associated with the engine.

Accordingly, in unity with the present invention, sensing involves the condition which is a function of the speed of rotation of the engine on a coil which is operatively attached to the engine; on a pump which is operatively attached to the engine; on a distributor which is operatively attached to the engine; on a generator which is operatively attached to the engine; on an alternator which is operatively attached to the engine; on a flywheel which is operatively attached to the engine; on a fan blade which is operatively attached to the engine; on a pulley which is operatively attached to the engine; on a camshaft which is operatively attached to the engine; on a cutter wheel which is operatively attached to the engine; on a drive train which is operatively attached to the engine; and/or on a drive shaft which is operatively attached to the engine and operatively attached to a cutter wheel.

In accordance with the present invention, a stump cutter having an engine operable at a speed of rotation including an optimum speed of rotation, and a cutter disposed to cut a tree stump is provided with a sensor for sensing a condition of a component of a stump cutter wherein condition being a function of a speed of rotation of the engine; and a control for controlling movement of the stump cutter toward a stump based on the function of the speed of rotation of the engine.

For purposes of the present invention, the control includes a speed reducer for reducing the speed of advancement of the stump cutter toward the stump when the speed of rotation of the engine is at a predetermined speed of rotation, an accelerator for increasing a speed of advancement of the stump cutter toward the stump when the speed of rotation of the engine is at a predetermined speed of rotation, and an arrestor or brake for stopping advancement of the stump cutter toward the stump when the speed of rotation of the engine arrives is at a predetermined speed of rotation.

Accordingly the component, the condition of which is a function of the engine speed being sensed, may be a coil which is operatively attached to the engine; a pump which is operatively attached to the engine; a distributor which is operatively attached to the engine; a generator which is operatively attached to the engine; an alternator which is operatively attached to the engine; a flywheel which is operatively attached to the engine; a fan blade which is operatively attached to the engine; a pulley which is operatively attached to the engine; a camshaft which is operatively attached to the engine; a cutter wheel which is operatively attached to the engine; a drive train which is operatively attached to the engine; and/or a drive shaft which is operatively attached to the engine and operatively attached to a cutter wheel.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein:

FIG. 7 is a schematic representation of a control system according to the present invention including a diverting valve and associated circuit elements;

FIG. 8 is a schematic of an alternate diverting valve circuit;

FIG. 9 is a schematic of a still further alternative diverting valve circuit;

FIG. 16 is a schematic view of the engine of a stump cutter showing several alternate embodiments for providing a signal which is a function of the speed of rotation of the engine;

FIG. 17 is a perspective view showing a device for sensing the speed of the engine flywheel;

FIG. 18 is a perspective view showing devices for sensing the speed of the radiator fan and the speed of a pulley on the engine;

FIG. 19 is a perspective view showing a sensor disposed to sense the rotation of a slotted disc on the end of the engine's camshaft;

DETAILED DESCRIPTION OF THE INVENTION

Figure 1:
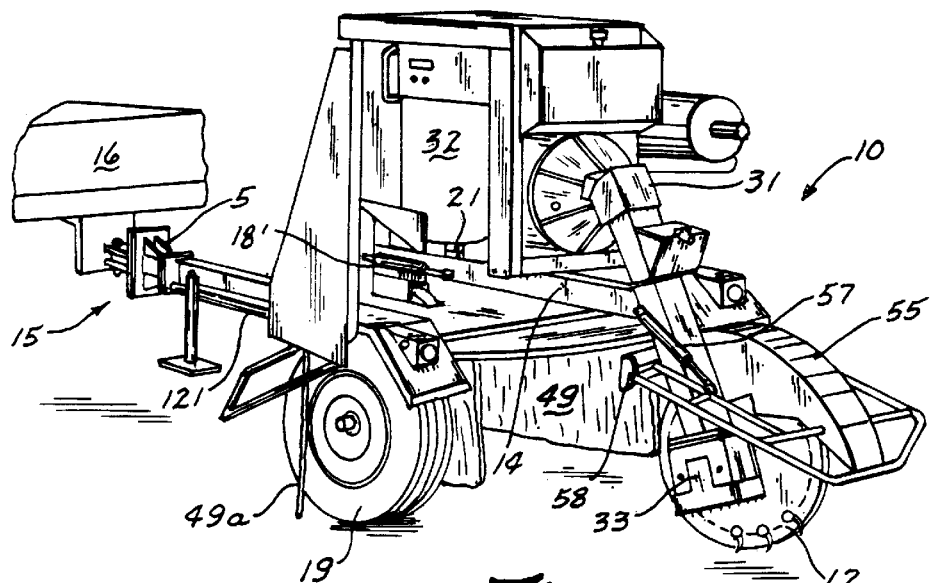
FIG. 1 is a perspective view of a preferred embodiment of a stump cutter of the present invention attached to a towing vehicle.
Figure 2:
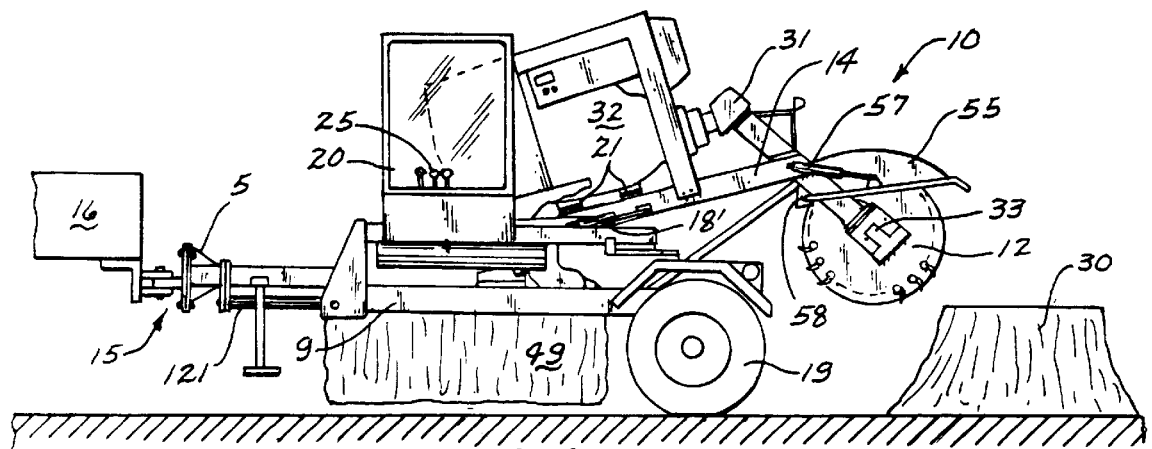
FIG. 2 is a side elevational view of the stump cutter of FIG. 1 shown in readiness to cut a stump.
Figure 3:
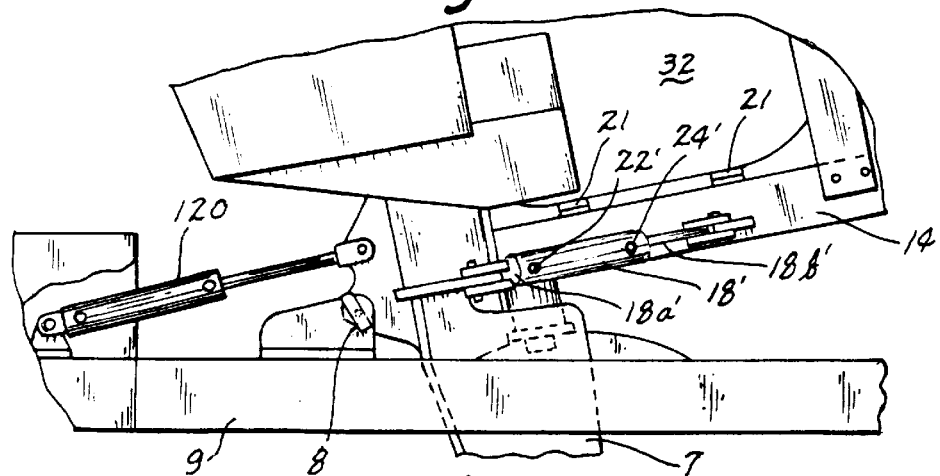
FIG. 3 is an enlarged partial side elevational view showing the cylinder that raises and lowers the stump cutter boom, and one of the cylinders that oscillates the boom from side-to-side.
Figure 4:
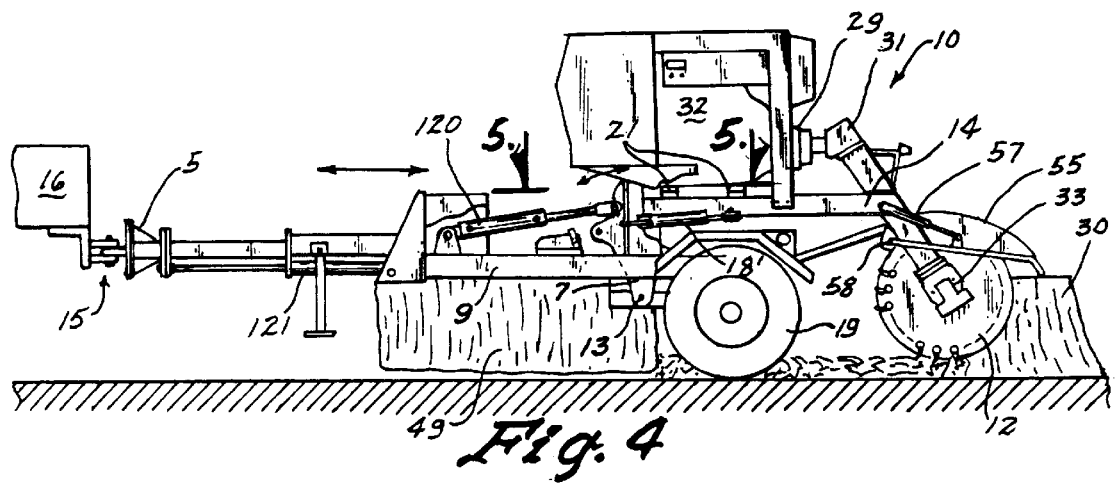
FIG. 4 is a side elevational view similar to FIG. 2 showing the stump cutter in the lowered position engaging and cutting a stump, and showing the tongue extended from the position shown in FIG. 2.
Figure 5:
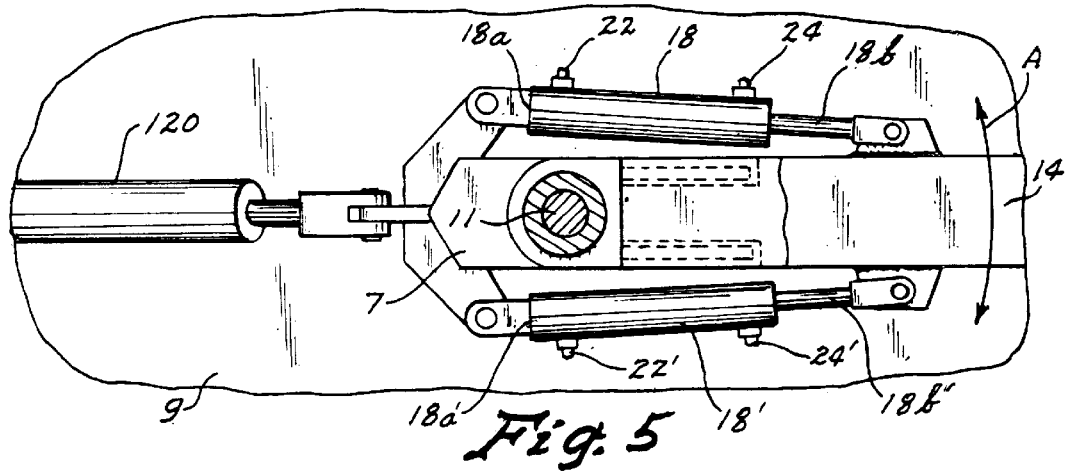
FIG. 5 is an enlarged partial cross-sectional view taken along line 5—5 of FIG. 4, showing the boom lifting cylinder, and the cylinders used to oscillate the cutter wheel back and forth across the surface of the stump.

Referring now to the drawings wherein like reference numerals designate identical or corresponding parts throughout the several views, FIGS. 1 and 2 show a stump cutter (10) constructed in accordance with the present invention. As best shown in FIGS. 1–5, the stump cutter (10) includes a frame (9) having a movable boom (14) pivotally attached to the frame (9) about a horizontal axis of pin (13). Referring to FIGS. 4 and 5, a connector member (7), including the pin (13), also permits the boom (14) to pivot about the vertical axis of shaft (11) as shown in FIG. 5. A hitch assembly (15) permits the stump cutter (10) to be hitched to a towing vehicle (16) and a tongue extending cylinder (121) permits the tongue (5) to telescope between the retracted position shown in FIG. 2 and the extended position shown in FIG. 4. Pneumatic wheels and tires (19) are rotatably attached to the frame (9) for permitting the stump cutter (10) to be towed from place to place, and also to facilitate the movement of the tongue (5) by the tongue extension cylinder (121) between the positions shown in FIGS. 2 and 4.

An engine (32) is mounted by resilient engine mounts (21) to the boom (14) as shown in FIGS. 1–4. Turning to FIGS. 2 and 7, the engine (32) is shown powering a hydraulic pump (35) for providing hydraulic fluid to the tongue extension cylinder (121), the boom lifting cylinder (120), and the boom swinging cylinders (18, 18'). The boom lifting cylinder (120) raises and lowers the boom (14) between the positions shown in FIGS. 2 and 4. The swing cylinders (18, 18') oscillate the boom (14) in an arc as indicated by the directional arrow A shown in FIG. 5. By connecting the source of high pressure hydraulic fluid to ports (22') and (24), while allowing hydraulic fluid to flow out of ports (22) and (24'), the boom (14) will move to the left (FIG. 1–4). Reversing the flow will cause the boom (14) to move to the right (FIGS. 1–4). The engine (32) has a rotary output shaft (not shown) which connects to a clutch (29) which can be used to selectively transmit rotary power into a gear box (31). The gear box (31) is of a conventional type, including meshing bevel gears with input and output shafts angularly disposed with respect to each other. The ratio of power transmission can be set at any desired level, for example 1:1, or any other ratio desired. Rotary power is transmitted by a shaft interconnecting the upper gear box (31) and a lower gear box (33), which, in turn, transmits rotary power to the cutter wheel (12).

To operate the preferred embodiment shown in FIGS. 1–5, the towing vehicle (16) is used to tow the stump cutter (10) to the location of the stump (30), and position it as shown in FIG. 2, by backing it up to the stump (30). The operator then moves the panel (20) out to the operating position. The top of the panel (20) includes a transparent viewing window and a flexible rubber curtain (49a) which hangs down from the panel (20) to protect the legs of the operator. The curtain assembly (49) actually extends completely around the rear and sides of the frame (9) of the stump cutter (10) to catch and collect the chips from the cutting wheel (12). Once the engine (32) is started, the operator engages the clutch (29) to cause the drive train to rotate the cutter wheel (12). By operating the control levers (25) on the panel (20), the operator extends the cylinder (120) so that the cutter (12) engages the stump (30). The tongue (5) is also extended from the position shown in FIG. 2 to the position shown in FIG. 4. This can be done in any order desired. The lift cylinder (120), of course, causes the cutter wheel (12) to move up and down and the tongue cylinder (121) causes the cutter wheel (12) to move fore and aft, towards and away from the stump (30). The operator simultaneously uses the controls (25) to cause the hydraulic swing cylinders (18, 18') to move the boom (14) in an oscillating arc over the surface of the stump (30), thereby causing the stump to be cut away. The chips are collected in the area enclosed by the curtain (49) as shown in FIG. 4. In the FIG. 4 position, when the cutter wheel shield (55) abuts the top of the stump (30), it pivots upwardly about a pivot point (58) and against the resistance cylinder (57), which biases it to its lowered position shown in FIGS. 1 and 2. Having the oscillating feature of the boom (14) is extremely important because if it were not present on the frame (9), it would require that the towing vehicle (16) be used to re-position the cutter wheel (12) from time to time to move it to one side or the other of the stump (30).

FIG. 7 shows a stump cutter (10) having a cutter wheel (12) mounted on a boom structure (14) for rotation about the axis X—X of wheel (12). The boom structure (14) is pivotally mounted to a support platform or frame (9), by connector member (7), to pivot about a generally vertical axis of shaft (11).

In the preferred embodiment, an actuator in the form of two hydraulic cylinders (18, 18') are provided for urging the boom structure and cutter wheel (12) to move back and forth along the direction of travel indicated by arrow A. Other advancing structures, such as electric actuators, could be used instead. The hydraulic cylinders include a head end (18a, 18a') and a rod end (18b, 18b'). The head ends (18a, 18a') are pivotally mounted to a connector member (7) as shown in FIGS. 3 and 5. The rod ends (18b, 18b') are pivotally mounted to the boom structure (14) as shown in FIGS. 3, 5 and 7.

The hydraulic cylinders include first ports (22, 22') and second ports (24, 24'). The first ports (22, 22') pass hydraulic fluid into or out of the head ends (18a, 18a') of the cylinders (18, 18'). The second ports (24, 24') pass hydraulic fluid into or out of the rod end (18b, 18b') of the hydraulic cylinder (18, 18') as is conventional.

With the structure thus described, when hydraulic fluid is admitted to ports (22, 24'), the boom structure and cutter wheel move downwardly in the view of FIGS. 5 and 7. When hydraulic fluid is admitted to the ports (24, 22'), the boom structure and cutter wheel move upwardly as viewed in FIGS. 5 and 7. By reason of moving the cutter wheel (12) in the direction of arrow A, the cutter wheel (12) can be advanced across the face of a stump (30) to thereby remove the stump (30).

Power to the cutter wheel (12) is provided by an engine (32) which may be powered by gasoline or diesel fuel. A pump drive arrangement (34) from the engine (32) drives a hydraulic pump (35), which is a source of hydraulic fluid for the cylinders (18, 18').

From time to time, the operator will advance the cutter wheel into the stump at a rate faster than a rate that the engine (32) can handle. The result is a reduction in the speed of the engine (32) below its rated output speed. The present invention, in its preferred embodiment, is directed to an electronic and hydraulic circuit for reasonable avoidance of engine overload, i.e., engine operation below the rated operating speed. Also, it is desirable to maintain a feed rate that will fully load the engine rather than having the engine underloaded.

The hydraulic circuit (FIG. 7) includes a main control valve (36) having a first hydraulic line (38) connected to ports (22, 24'). In one embodiment, FIG. 7, line 38 has segments (38a) and (38b) joined by a valve (50) as will be described. A second hydraulic line (40) connects the control valve (36) to ports (22', 24). A line (42) connects the control valve (36) to a sump (44). A source line (46) connects the control valve (36) to the hydraulic pump (35).

The control valve (36) may be shifted from a first position shown to a second position reversing the flow from the first position thereof. The valve (36) also has a third position shown by the center portion of valve (36) in FIG. 7 which allows no flow to the boom swing cylinders (18, 18'). In the first position, pressurized hydraulic fluid from line (46) is admitted to line (38). Also, in the first position, hydraulic fluid in line (40) is passed through line (42) to sump (44). When the control valve (36) is shifted to its second position, pressurized hydraulic fluid from line (46) is passed to line (40) and hydraulic fluid in line (38) is vented through line (42) to sump (44). The control valve (36) is shiftable by an operator to selectively permit the operator to change the direction of travel of the cutter wheel between the direction of arrow A in FIG. 7, and the opposite direction.

Figure 6:
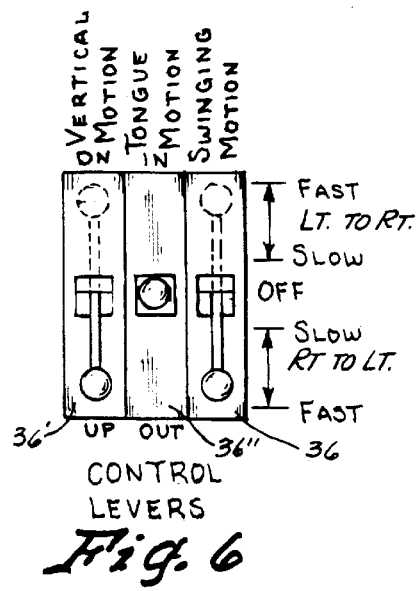
FIG. 6 is a top plan view of the hydraulic control levers used to actuate the hydraulic cylinders.

It is noted that in FIG. 7, valve (36) is shown in a simplified form. In actuality, the valve (36) represents one spool of what is typically a multi-spool valve block as illustrated in FIG. 6. The oil, therefore, does not usually come directly from the pump (35), pass through the spool valve (36) and go back to the sump (42) without being used for other functions such as for the lift cylinder (120) and the tongue extension cylinder (121).

A solenoid-operated valve (50) is disposed along line (38) and has a vent line (52) connected from the solenoid-operated valve to line (40). The solenoid-operated valve (50) is shiftable between at least two positions. In its first position, line (38a) is uninterrupted. In the second position, line (38a) is connected to line (40). The solenoid valve (50) is shifted between the first and second positions by use of a signal-processing circuit (54).

As is conventional, engine (32) is provided with an alternator (56). The alternator (56) generates a signal that is proportional to engine (32) speed. Engine speed could be sensed by other devices, for example, off a crankshaft pulley. The signal sensed by sensor (60) is passed along electrical circuit line (62) to the signal processor (54). Signal processor (54) is connected by electrical line (64) to the solenoid valve (50).

Upon the sensor (60) generating a signal indicating an engine speed at or preferably below a predetermined minimum (for example, below 2600 rpm), the signal-processing circuit (54) activates the solenoid valve (50) to shift the solenoid valve (50) to the second position to divert fluid flow between lines (38a) and (40). When the speed of the engine (32) is sensed to be at or preferably above the predetermined minimum, the signal-processing circuit returns the solenoid valve (50) to its first position wherein no diverting of flow occurs between lines (38a) and (40).

An optional needle valve (70) is also provided connecting lines (38a) and (40). Needle valve (70) may be adjusted by an operator to control the amount of flow, if any, between lines (38a) and (40).

FIG. 8 shows an alternative placement of valve (50). Unlike FIG. 7, the valve (50) is not located in line (38). The valve (50) is positioned much like valve (70), between the pressure and return lines (38) and (40). The valve (50) allows oil flow from whichever is the pressure line (38 or 40) to line (52). Check valves (51) direct the flow of oil. FIG. 9 shows a still alternative placement of valve (50) similar to FIG. 8. In each of FIGS. 7, 8 and 9, needle valve (70) is optional and valve (50) is preferably a proportional valve.

With the invention thus described as shown in FIG. 7, the present invention retards the advance of the cutter wheel (12) in response to reduced engine speed. The system responds before an overload condition occurs. In response to reduced engine speed, the advance of the cutter (12) into the stump (30) is retarded by reason of flow being diverted to the return line (42) and sump (44).

In the present invention, oil or hydraulic fluid is directed away from the swing cylinder system by proportional valve (50) in greater quantities as the engine speed decreases. As a result, under certain conditions, the boom (14) will not swing at all. Accordingly, such a system can provide for disabling the electrical circuit automatically when the cutter wheel drive is disengaged by placing switch (230) in the position shown in FIG. 15. As a result, the operator or maintenance personnel may swing the boom (14) at any engine speed when necessary or desirable.

Figure 15:
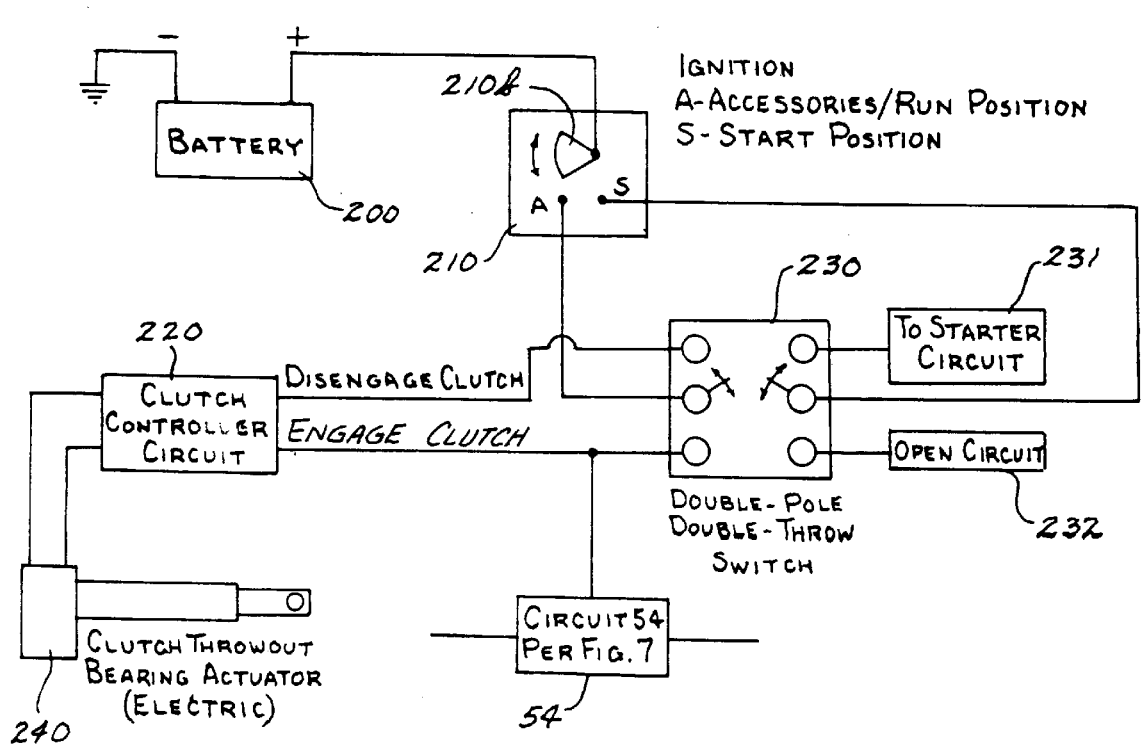
FIG. 15 is a schematic representation of a disabling system for the control system.

FIG. 15 illustrates an electrical circuit for disabling the control system for the swing cylinders (18, 18'). The circuit includes a double-pole, double-throw switch (230) connected across an ignition switch (210) to a battery (200). The ignition switch can be positioned in one of three positions. In the position shown, the battery (200) terminates at an open circuit.

The ignition switch (210) can be thrown to two active positions. In the first active position, contact is made only with contact A. In the second position, the switch element (210b) makes contact simultaneously with both contact points A and S.

The contact position A (FIG. 15) refers to a contact position for both the accessories and a normal run position. Contact position S is a position for starting the engine (32) of the stump cutter (10). The switch (230) is connected to a starter circuit (231), a clutch controller circuit (220) (as is conventional) and the circuit (54) of FIG. 7. The switch (230) may be thrown to an up position in which case power is provided to the starter circuit (231), assuming ignition switch element (210b) of switch (210) is in contact with contact S. Simultaneously, the switch (230) is in a clutch disengage position such that circuit (220) provides power to a clutch actuator (240) to disengage the clutch. When switch (230) is thrown in the down position, the power is diverted from the starter circuit (231) to an open circuit (232) and power is provided to an engage side of the clutch control circuit (220) to operate the clutch actuator (240). Simultaneously, power is also provided to circuit (54) to permit the control of valve (50) of FIG. 7. It will be appreciated that the clutch control circuit (220) and the clutch actuator (240) are commercially available items.

Figure 10:
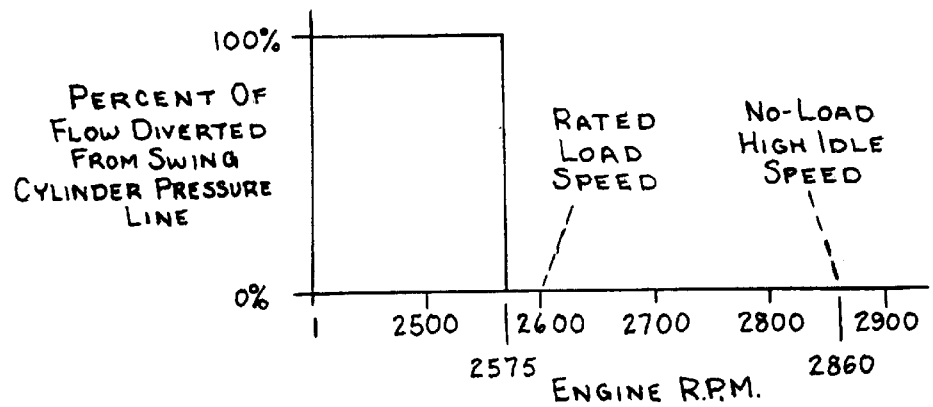
FIG. 10 is a graphical representation of an operation of a control system for a stump cutter according to the present invention using an on-off solenoid valve.

In the foregoing discussion, the valve (50) may be a simple "on-off" valve. However, it is believed that such a valve (50) could lead to choppy cutting performance and that a proportional valve (50) is preferred. With reference to FIG. 10, a graph is shown indicating operation of the system of the present invention where valve (50) is an on-off solenoid valve. FIG. 10 illustrates the amount of oil or hydraulic fluid being diverted from the swing cylinders (18, 18') as a function of an engine rpm for engine (32). In FIG. 10, a specific engine is presented which has representative performance of a no-load high idle speed at 2,860 rpm and a rated load speed of 2,600 rpm. The valve (50) is controlled by circuitry (54) to divert one hundred percent of the oil or hydraulic fluid from the cylinders (18, 18') upon obtaining a sensed engine speed of 2,575 rpm. As the load increases, the engine speed will decrease from high idle (no load) speed. When the load becomes such that the engine speed drops one percent (i.e., about 25 rpm) below the rated load speed, one hundred percent of the hydraulic fluid is diverted away from the pressure line and routed to the return line. As the engine speed recovers, one hundred percent of the flow is again directed to the swing cylinders (18, 18').

Figure 11:
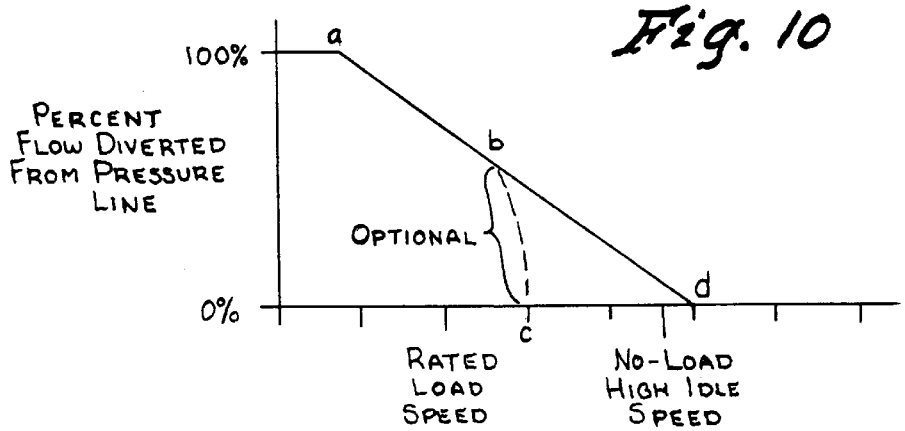
FIG. 11 is the graphical representation of the operation of the control system when modified to reflect the use of a proportional controlled solenoid valve.

As previously mentioned, it is believed that an on-off solenoid valve in place of valve (50) may result in a jerky cutting operation for a stump cutter. FIG. 11 represents the operation of the stump cutter where valve (50) is a proportional solenoid valve. The solid line of FIG. 11, indicated by points a-b-d, represents a proportional solenoid valve (50)

where the amount of hydraulic fluid being diverted from the swing cylinders (18, 18') increases approximately as a straight line function to a responsive decrease in engine rpm. In this example, the amount of hydraulic fluid diverted from the swing cylinder pressure line varies in proportion to the engine speed. Optional line a-b-c permits a faster swing operation under low load conditions where an operator may be interested in rapidly positioning the cutter wheel (12) to a different location. Line a-b-d provides smoother engagement of the swinging boom structure (14) and cutter wheel (12) with the stump (30) when an unloaded cutter wheel (12) first contacts the stump (30). Through selection of the circuitry of circuit (54), either of the graph profiles shown in FIG. 11 is attainable. Also, line a-b-d or line a-b-c should be established to ensure that the engine (32) runs as close as possible to the rated load speed during the working cycle of the engine (32) and the stump cutter (10). It is undesirable to either overwork or underwork the engine.

Further, it may desirable to disengage the electrical circuit (54) when the cutter wheel drive is disengaged with a system such as that shown in FIG. 15 by use of switch (230). This will permit the boom structure (14) to swing at reduced engine speeds such as when performing maintenance. Also, it may be desirable to provide a lock (8) (FIG. 3) which may mechanically lock the boom structure (14) in place during transportation.

Figure 12:
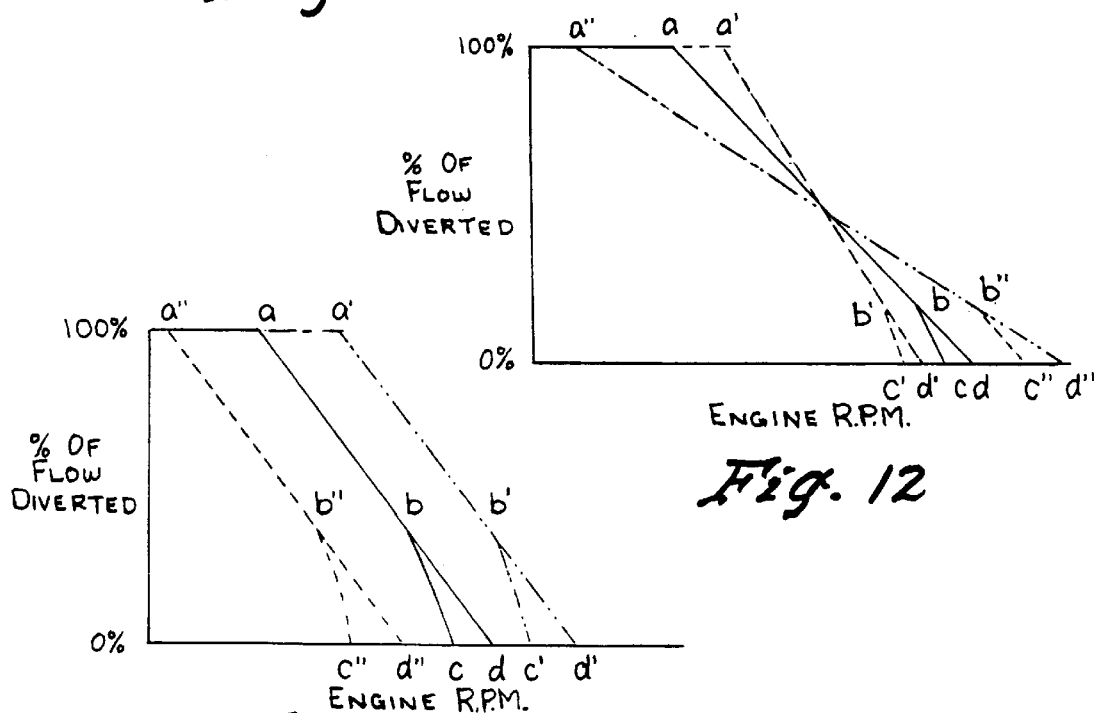
FIG. 12 is the graphical representation of the operation of FIG. 11 showing modification of the slope of the performance graph of FIG. 11.
Figure 13:
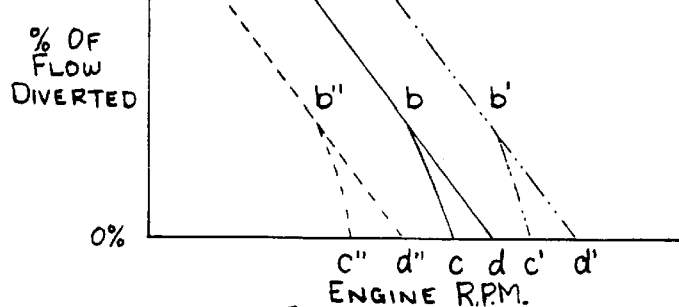
FIG. 13 is the modification of the graph of FIG. 11 showing translational repositioning of the graph.

A still further alternative embodiment of the present invention is to provide circuitry (54) to modify the positioning and geometry of lines a-b-c and a-b-d in FIG. 11. This is illustrated in FIGS. 12 and 13. In FIG. 12, the slope of lines a-b-d and a-b-c are modified, as illustrated by lines a'-b'-d', a'-b'-c', a"-b"-d" and a"-b"-c", to change the slope of the graphs. In FIG. 13, the positioning of the lines is translated to the left or the right of the original lines a-b-c-d. Either option can be selected through modification of circuitry (54).

Figure 14:
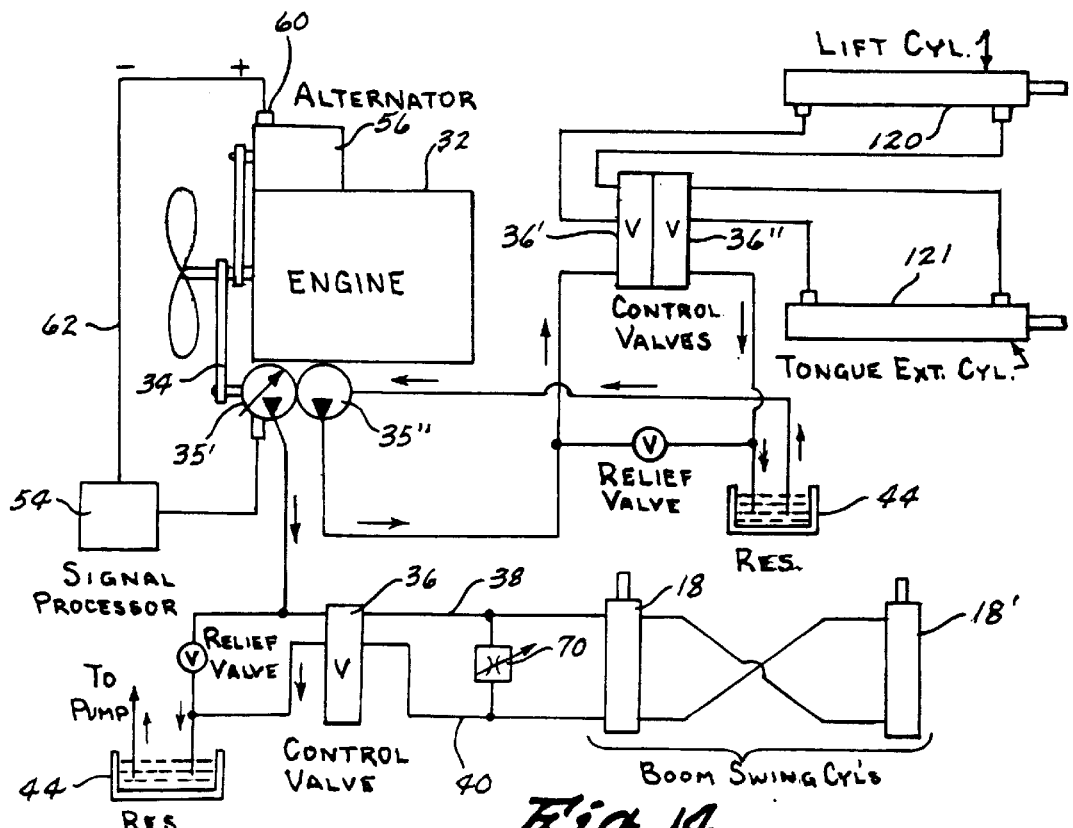
FIG. 14 is a schematic representation of an alternative embodiment of the present invention.

A still further embodiment of the present invention is shown in FIG. 14. In FIG. 14, the proportional control valve (50) is not utilized. Instead, a variable displacement pump (35') is utilized. The sensed speed of the engine (32) is utilized by circuitry (54) to control the output of the variable displacement pump (35') which then controls the control valve (36) operating the swing cylinders (18, 18'). A standard pump (35") controls the raising and lowering cylinder (120) and a tongue extending cylinder (121) typically found with stump cutters which are controlled by separate respective control valves (36') and (36") (FIGS. 6 and 14). With the embodiment of FIG. 14, the variable output being provided to the swing cylinders (18, 18') is provided by a variable output pump (35') rather than by a proportional solenoid valve (50) of the previously discussed embodiments. A further alternative to FIG. 14 is to eliminate pump (35") and have pump (35') provide flow to valves (36') and (36") as well as to valve (36).

FIGS. 16–21 essentially show the equivalence of using a sensor (60) to sense the speed of the engine (32) with other devices which either directly sense a condition of a component of the stump cutter, which is a function of the engine speed or sense a condition of another component of the stump cutter which can produce a signal which is a function of speed of the engine (32).

Components of the stump cutter, a condition which may be sensed for purposes of the present invention, include components selected from the group consisting of a coil, a pump, a distributor, a generator, an alternator, a flywheel, a fan blade, a pulley, a camshaft, a cutter wheel, a drive train and a drive shaft.

The condition of such components, which is a function of the engine speed that is sensed by sensors in accordance with the present invention, is described in more detail below.

In FIG. 16, the alternator/generator (56) generates a signal which is transmitted to the computer/controller (71). The signal from the alternator/generator (56) will then be processed in the computer/controller (71) to indicate that it is a function of the speed of the engine (32) and this information is then used to maintain the optimum rpm of the engine (32).

Similarly, the coil (73), a sensor (74) on the pump (75) and the distributor (77) can be utilized to send a signal to the computer/controller (71). Since these signals indicate conditions which are all a function of the engine speed, they can be used to control the optimum speed of the engine (32) as described above by regulating the rate of advancement of the cutter wheel toward the stump as may be required to reduce or increase the load on the engine (32) through the cutter wheel's contact with the stump.

Turning to FIG. 17, a flywheel (78) of the engine (32) is shown with a starter (79). The teeth (80) of the engine flywheel can individually be sensed as they pass by the sensor (81.) The signal produced by sensing the speed of the teeth (80) of the flywheel (78), a condition which is a function of the speed of the rotation of the engine (32) is fed to the computer/controller (71) to control the movement of the stump cutter (10).

In FIG. 18, the speed of the blades of engine radiator fan (82) is sensed by use of a light transmitter (83) which sends a signal of light to a light detecting device (84). The blades of the engine radiator fan (82) interrupt the light as they pass by. As the light is applied and then taken away from the photo detecting device (84), the device (84) will emit a signal. A counter (not shown) will count these signals and then transfer this information to the controller/microprocessor (71). This signal is transmitted to the computer/controller (71) for indicating the speed of the engine (32). These optical type sensors can, of course, be used on other moving devices such as on the teeth of a gear.

Similarly, a pulley (85) driven by a belt (86) off drive pulley (87) has openings (88) therethrough. An optical sensor which includes a light transmitter (89) and a light receiver (90), senses the passage of light through the openings in the pulley (85). The speed of the rotation of the pulley (85) is a sensed condition of the pulley (85), which is a function of the speed of rotation of the engine (32). This information is transmitted to the computer/controller (71) and is used to control the rate of advancement of the cutter wheel (12) towards the stump in a manner discussed in detail above.

FIG. 19 shows the engine (32) with a four-leaf-clover shaped disc (91) attached to the end of the camshaft (92). A magnetic sensor (93) is positioned to sense the passage of each of the lobes of the disc (91) as a condition of the camshaft (92) which condition is a function of engine speed. This provides information to the computer/controller (71) for controlling the advancement of the cutter wheel (12) above. Disc (91) is not part of the camshaft gear but is a special disc added to the camshaft for this sensing purpose. Disc (91) can have more or less lobes or depressions than the number shown in FIG. 19.

Figure 20:
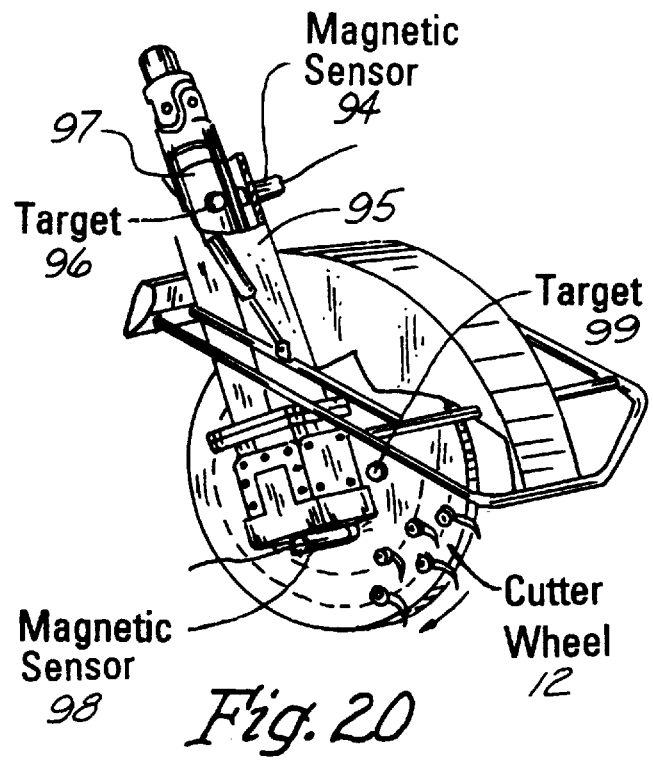
FIG. 20 is a perspective view similar to FIG. 1 showing magnetic sensors disposed to sense the speed of rotation of the cutter wheel and, alternatively, the drive train of the cutter wheel.

Referring now to FIG. 20, a magnetic sensor (94) is shown disposed on the shield (95) and a target (96) is disposed on the drive shaft (97). The sensor (94) detects the passage of the target (96) in its rotation on the shaft (97). Shaft rotation is a condition which is a function of engine speed. A signal from the sensor (94) is transmitted to the computer/controller (71) for processing to control the advancing of the cutter wheel (12) toward the stump as discussed above.

A magnetic sensor (98) also is shown in FIG. 20 for sensing the speed of the cutter wheel (12) by sensing when the target (99) passes by the magnetic sensor (98). Similarly, this information from the magnetic sensor (98) is fed to the computer/controller (71) for controlling the advancement of the cutter wheel (12) towards the stump.

Figure 21:
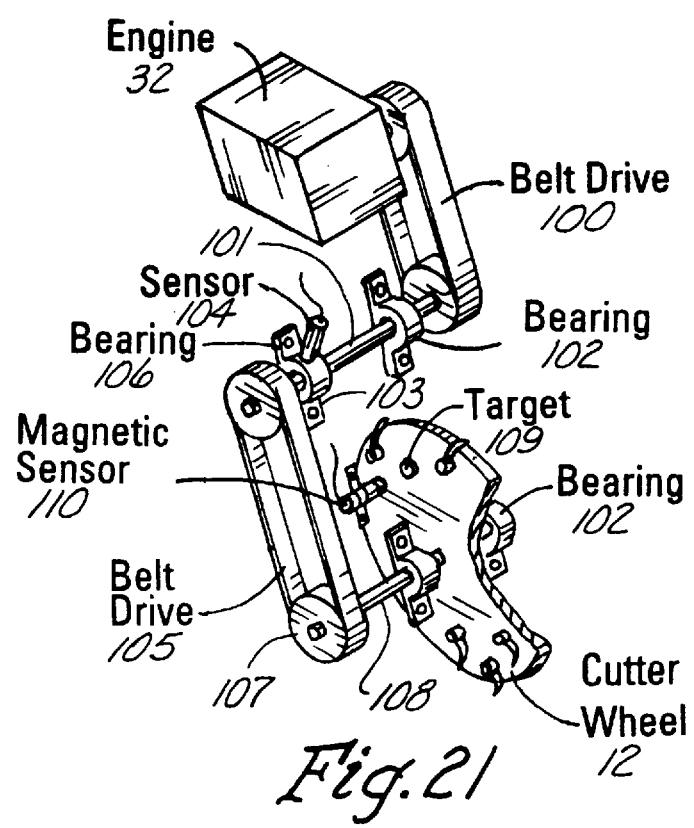
FIG. 21 is a schematic view showing sensors disposed to sense the rotation of a shaft through a bearing and a sensor to sense the rotation of the cutter wheel.

Referring now to FIG. 21, the engine (32) drives a drive belt (100) around pulleys which, in turn, drives a shaft (101). The drive shaft (101) is supported by bearings (102 & 103). The bearing (103) has a sensor (104) thereon for sensing the speed of rotation of the shaft (101).

Bearings which will sense the speed of shaft rotation can be purchased as a unit, for example, Dodge brand bearing monitors are available from Rockwell Automation Corporation.

Similarly, a belt (105) is driven by pulley (106) and drives pulley (107) to turn the shaft (108) of cutter wheel (12). This cutter wheel (12) has a target (109) thereon which is sensed by magnetic sensor (110). The rotation of the cutter wheel (12) is a function of the speed of the engine (32). The signal from sensor (110) is fed to the computer/controller (71), and this signal is used to control the speed of the engine (32) as discussed above.

FIGS. 16–21, therefore, show various ways that a condition of a component which is a function of the speed of the engine (32) can be sensed either directly or indirectly. Of course, those skilled in this art can conceive of many other ways to sense the speed of the engine (32) or of things or components that could be a function of the speed of the engine (32). For example, even a strain gauge (not shown) on the engine mounts could sense torque and provide information which would be a function of the speed of the engine (32).

In FIGS. 16–21 numerous ways are shown to sense a condition which is a function of the engine speed or the actual engine speed. Thus, although a plurality of ways are illustrated, it is only necessary to use one of these in any one situation. For example, in FIG. 16 if the speed of the alternator/generator (56) is being used to send a signal to the computer/controller (71), then it is not necessary to sense any other speed or condition of another component of the stump cutter which is a function of engine speed.

Although only exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A method for operating an engine of a stump cutter, said method comprising:
    sensing a condition of a component of a stump cutter having an engine, said condition being a function of a speed of rotation of the engine; and
    controlling movement of said stump cutter toward a stump based on said function of the speed of rotation of the engine.

2. The method of claim 1 wherein said controlling comprises reducing a speed of advancement of said stump cutter toward the stump when the speed of rotation of the engine is below a predetermined speed of rotation.

3. The method of claim 1 wherein said controlling comprises increasing a speed of advancement of said stump cutter toward the stump when the speed of rotation of the engine is above a predetermined speed of rotation.

4. The method of claim 2 wherein said controlling comprises increasing the speed of advancement of said stump cutter toward the stump when a speed of rotation of the engine is above a predetermined speed of rotation.

5. The method of claim 1 wherein said controlling comprises stopping advancement of said stump cutter toward the stump when the speed of rotation of the engine arrives at a predetermined speed of rotation.

6. The method of claim 1 wherein said component of said stump cutter comprises at least one member selected from the group consisting of a coil, a pump, a distributor, a generator, an alternator, a flywheel, a fan blade, a pulley, a camshaft, a cutter wheel, a drive train and a drive shaft which are operably associated with said engine.

7. The method of claim 1 wherein said sensing comprises sensing said condition which is a function of the speed of rotation of the engine on a coil which is operatively attached to the engine.

8. The method of claim 1 wherein said sensing comprises sensing said condition which is a function of the speed of rotation of the engine on a pump which is operatively attached to the engine.

9. The method of claim 1 wherein said sensing comprises sensing said condition which is a function of the speed of rotation of the engine on a distributor which is operatively attached to the engine.

10. The method of claim 1 wherein said sensing comprises sensing said condition which is a function of the speed of rotation of the engine on a generator which is operatively attached to the engine.

11. The method of claim 1 wherein said sensing comprises sensing said condition which is a function of the speed of rotation of the engine on an alternator which is operatively attached to the engine.

12. The method of claim 1 wherein said sensing comprises sensing said condition which is a function of the speed of rotation of the engine on a flywheel which is operatively attached to the engine.

13. The method of claim 1 wherein said sensing comprises sensing said condition which is a function of the speed of rotation of the engine on a fan blade which is operatively attached to the engine.

14. The method of claim 1 wherein said sensing comprises sensing said condition which is a function of the speed of rotation of the engine on a pulley which is operatively attached to the engine.

15. The method of claim 1 wherein said sensing comprises sensing said condition which is a function of the speed of rotation of the engine on a camshaft which is operatively attached to the engine.

16. The method of claim 1 wherein said sensing comprises sensing said condition which is a function of the speed of rotation of the engine on a cutter wheel which is operatively attached to the engine.

17. The method of claim 1 wherein said sensing comprises sensing said condition which is a function of the speed of rotation of the engine on a drive train which is operatively attached to the engine.

18. The method of claim 1 wherein said sensing comprises sensing said condition which is a function of the speed of rotation of the engine on a drive shaft which is operatively attached to the engine and operatively attached to a cutter wheel.

* * * * *